United States Patent
Kushida et al.

(10) Patent No.: US 6,916,458 B2
(45) Date of Patent: Jul. 12, 2005

(54) PROCESS FOR PRODUCING HYDROGEN-CONTAINING GAS

(75) Inventors: Yasuhiro Kushida, Niigata (JP);
Masayuki Katagiri, Niigata (JP);
Hutoshi Ikoma, Niigata (JP);
Shigeyuki Hirose, Niigata (JP);
Yasushi Hiramatsu, Niigata (JP);
Mikio Yoneoka, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 254 days.

(21) Appl. No.: 10/291,375

(22) Filed: Nov. 12, 2002

(65) Prior Publication Data

US 2003/0157019 A1 Aug. 21, 2003

(30) Foreign Application Priority Data

| Nov. 20, 2001 | (JP) | ................................... 2001-354728 |
| Nov. 20, 2001 | (JP) | ................................... 2001-354730 |
| Nov. 22, 2001 | (JP) | ................................... 2001-357303 |
| Dec. 28, 2001 | (JP) | ................................... 2001-400195 |

(51) Int. Cl.[7] ................................................. C01B 3/26
(52) U.S. Cl. ........................................ 423/651; 252/373
(58) Field of Search ............................ 423/648.1, 651; 252/373

(56) References Cited

U.S. PATENT DOCUMENTS

2001/0016188 A1   8/2001   Haga et al.

FOREIGN PATENT DOCUMENTS

| JP | 60-82137 | | 5/1985 | |
| JP | 60137434 A | * | 7/1985 | ............ B01J/23/64 |
| JP | 63-129002 | | 6/1988 | |
| JP | 8-215571 | | 8/1996 | |
| JP | 10-80636 | | 3/1998 | |
| JP | 2001-185190 | | 7/2001 | |
| JP | 2001185190 A | * | 7/2001 | ............ H01M/8/06 |

OTHER PUBLICATIONS

Communication and European Search Report mailed Mar. 8, 2004, for EP No. 02 02 5359.

* cited by examiner

Primary Examiner—Stanley S. Silverman
Assistant Examiner—Maribel Medina
(74) Attorney, Agent, or Firm—Antonelli, Terry, Stout & Kraus, LLP

(57) ABSTRACT

There is disclosed a process for producing a hydrogen-containing gas, which comprises reacting methanol, steam and oxygen in the presence of a catalyst comprising palladium, zinc and at least one metal selected from the group consisting of chromium, gallium, copper, indium, bismuth and platinum. That is to say, the process include the following four aspects: (I) a process which comprises reacting methanol, steam and oxygen in the presence of a catalyst comprising palladium, zinc, and either or both of chromium and gallium; (II) a process which comprises reacting methanol, steam and oxygen in the presence of a catalyst comprising palladium, zinc, copper and chromium; (III) a process which comprises reacting methanol, steam and oxygen in the presence of a catalyst comprising palladium and zinc, or chromium added thereto optionally, and either or both of indium and bismuth; and (IV) a process which comprises reacting methanol, steam and oxygen in the presence of a catalyst comprising zinc oxide, palladium and platinum. The use of the above steam-reforming catalyst having a high activity, high selectivity and sufficient durability makes it possible to produce a hydrogen-containing gas which is composed principally of hydrogen and minimized in CO concentration in an industrially advantageous manner through an auto thermal reformer where methanol, steam and oxygen are reacted with one another.

17 Claims, No Drawings

PROCESS FOR PRODUCING HYDROGEN-CONTAINING GAS

BACKGROUND OF THE INVENTION

1. Field of the Invention

The present invention relates to a process for producing a hydrogen-containing gas. More particularly, the present invention pertains to a process for producing a reformed gas composed principally of hydrogen which comprises reacting methanol, steam and oxygen through an auto thermal reaction.

2. Description of the Related Arts

In recent years, attention has been paid to hydrogen which takes the place of fossil fuels. Hydrogen is expected as a prospective clean energy in future, since it is burnt into water alone without exhausting carbon dioxide which is the primary contributor to global warming or a harmful nitrogen oxide. It has hitherto been well known that methanol is reformed into a hydrogen-containing gas in the presence of a catalyst in a comparatively easy manner. In addition, methanol, which is reformed by reaction with steam (steam-reforming reaction) into a hydrogen-containing gas having a high concentration of hydrogen, has recently become a center of attraction as a simple convenient supply source of hydrogen which is expected to expand its demand in the near future.

On the other hand, during enhanced concern about global environment problem, attention has been given to a fuel cell as a clean power generation system which suppresses the exhaust of carbon dioxide being the primary contributor to global warming and which never exhausts a nitrogen oxide bringing about air pollution. The fuel cell is expected to be utilized not only as a power source for a moving object such as an automobile and marine vessel but also as a private power generation source for a factory, building, collective housing and the like, and an uninterruptible power source for hospitals dealing with medical machinery and equipment. In particular in the field of automobiles, development is set forward in a positive manner on an automobile which is driven by a methanol-reformed fuel. Since a fuel cell which is mounted on an automobile is called upon to be miniatured and simplified in its structure, development is set forward on a auto thermal reformer in which reaction heat necessary for steam-reforming reaction is supplied by the heat of combustion through the introduction of air into the reactor.

In a reactor of the auto thermal reaction, where methanol, steam and oxygen are reacted, part of methanol is burnt, so that the portion where oxidative reaction takes place is brought to a high temperature as compared with the steam-reforming reaction, and thereby a catalyst having high heat resistance is required.

In vehicle mounting application in which limitations are put on a mounting capacity and the like, a reforming reactor is called upon to be miniaturized, thus requiring a highly active and highly durable catalyst. Further in the case of a solid polymer electroyte fuel cell, since carbon monoxide in a reformed gas is adsorbed onto platinum of an electrode catalyst, thereby greatly deteriorating the function of the cell, the concentration of carbon monoxide in the reformed gas is preferably as low as possible.

The principal reaction in the steam-reforming reaction of methanol is represented by the chemical equations (i) and (ii):

$$CH_3OH \rightarrow CO + 2H_2 - 90.7 \text{ kJ/mol} \qquad (i)$$

$$CH_3OH + H_2O \rightarrow CO_2 + 3H_2 - 49.5 \text{ kJ/mol} \qquad (ii)$$

In order to efficiently produce hydrogen from methanol, the reaction in the chemical equation (ii) is more advantageous than the reaction in (i) in terms of much production amount of hydrogen, less endothermic reaction heat and non-formation of carbon monoxide.

There is proposed as a methanol reforming catalyst, a catalyst in which any of a variety of catalytic substrates is supported on a carrier such as alumina and silica.

For instance, there are proposed the catalyst comprising at least one metal which is selected from the group consisting of platinum and palladium and which is supported on a carrier wherein alumina is coated in advance with the oxide of an alkaline substance in Japanese Patent Application Laid-Open No. 68140/1982 (Showa 57); the methanol reforming catalyst which comprises nickel supported on a carrier comprising the oxide or hydroxide of at least one metal selected from the group consisting of copper, zinc and chromium in Japanese Patent Application Laid-Open No. 174138/1982 (Showa 57); and the methanol reforming catalyst comprising the oxide or hydroxide of at least one metal selected from the group consisting of copper, zinc and chromium and the oxide or hydroxide of nickel in Japanese Patent Application Laid-Open No. 174139/1982 (Showa 57). The catalysts proposed in the above-cited Japanese Patent Applications Laid-Open Nos. 68140/1982 (Showa 57), 174138/1982 (Showa 57) and 174139/1982 (Showa 57), respectively involve the problems of insufficient catalytic activity at a low temperature, liability to carbon deposition resulting in limited service life and the like problems.

In addition, there is proposed the alumina-based methanol decomposing catalyst comprising nickel and potassium incorporated in alumina in Japanese Patent Application Laid-Open No. 144031/1982 (Showa 57), but the catalyst involves the problems that a conversion at a reaction temperature of 350° C. is as low as, for instance, 52% and that for the purpose of increasing the conversion up to 75 to 91%, the catalyst must be subjected to a pretreatment at 500° C. in a stream of argon.

There is proposed the methanol reforming catalyst comprising at least one metal which is selected from the group consisting of platinum and palladium, and which is supported on a carrier wherein alumina is coated in advance with the oxide of an alkali metal in Japanese Patent Application Laid-Open No. 199043/1984 (Showa 59). The catalysts in Japanese Patent Applications Laid-Open Nos. 199043/1984 (Showa 59) and 68140/1982 (Showa 57) as mentioned hereinbefore suffer from an industrial disadvantage that they must be subjected to coating treatment in advance with the oxide of an alkaline substance (oxide of an alkali metal).

With regard to the above-cited Japanese Patent Applications Laid-Open Nos. 68140/1982 (Showa 57), 174138/1982 (Showa 57), 174139/1982 (Showa 57), 144031/1982 (Showa 57) and 199043/1984 (Showa 59), respectively, the reaction represented by the chemical equation (i) is the principal reaction, and carbon monoxide with a concentration of about 30% is contained in the reformed gas. Accordingly, it is necessary to produce hydrogen and carbon dioxide by means of water-gas shift reaction and separate the hydrogen. Further, the methanol decomposing reaction belongs to endothermic reaction, to which heat must be supplied from the outside of the reaction system, whereby the related equipment becomes intricate and troublesome.

As the methanol-reforming catalyst directed principally to the reaction represented by the chemical equation (ii), there has heretofore been proposed a copper-zinc base catalyst which is active at a low temperature and is high in selectivity to the reaction represented by the chemical equation (ii). However, the above-mentioned copper-zinc base catalyst suffers from such disadvantages that it is poor in heat resistance, and when put into a continuous operation for a long time, the catalytic activity and selectivity thereof are rapidly and continuously deteriorated.

On the contrary, there are proposed the catalyst comprising palladium and zinc oxide as the catalyst having excellent heat resistance and relatively high activity and durability in Japanese Patent Application Laid-Open No. 49930/1993 (Heisei 5); the catalyst comprising palladium or platinum each supported on a zinc oxide carrier in Japanese Patent Application Laid-Open No. 25662/2001 (Heisei 13); the catalyst which comprises a noble metal such as platinum, palladium, rhodium or indium each supported on a carrier comprising a basic metal oxide such as selenium dioxide or zirconium dioxide, and which also comprises an alkali metal or an alkaline earth metal supported thereon in Japanese Patent Application Laid-Open No. 246106/2000 (Heisei 12); the catalyst which comprises a noble metal (platinum), rhenium and an element belonging to the group 2B or 3B each supported on a carrier comprising a metal oxide such as aluminum oxide, cerium dioxide or zirconium dioxide in Japanese Patent Application Laid-Open No. 342968/2000 (Heisei 12); and the catalyst comprising palladium-gallium oxide, palladium-indium oxide, platinum-zinc oxide, platinum-gallium oxide or platinum-indium oxide in SHOKUBAI (Catalyst as a periodical) vol.42 (2000) pp. 212 to 217.

However, the above-described catalysts, which is directed principally to the reaction represented by the chemical equation (ii), suffer from drawbacks in that when used in auto thermal reaction by introducing air along with steam, carbon monoxide is formed in high concentration as compared with the copper-zinc base catalyst, and the selectivity to the reaction represented by the chemical equation (ii) is lowered during a long time service, whereby the carbon monoxide concentration is further increased.

Moreover, an evaluation is made of the catalyst through auto thermal reaction by the use of the catalyst comprising copper-zinc incorporated with palladium as a methanol-reforming catalyst for lowering the concentration of carbon monoxide in the reformed gas in Japanese Patent Application Laid-Open No. 185192/2001 (Heisei 13). The catalyst has excellent heat resistance and high activity, but is expected to be more improved.

That is to say, in the auto thermal reactor where methanol, steam and oxygen are reacted with one another, as part of methanol is oxidized into hydrogen and carbon dioxide, the portion where oxidative reaction takes place is brought to a high temperature as compared with the steam-reforming reaction, and thereby a catalyst having high heat resistance is required.

In vehicle mounting application wherein limitations are put on a mounting capacity, a reforming reactor needs to be miniatured, and thereby a catalyst having a high catalytic activity is required. In particular for fuel cell application, it is required that the reformed gas have a low carbon monoxide concentration, and that the selectivity to the reaction represented by the chemical equation (ii) is enhanced.

Under such circumstances, the object of the present invention is to provide a process for producing a gas comprising hydrogen as the principal ingredient in an industrially advantageous manner by means of an auto thermal reactor where methanol, steam and oxygen are reacted with one another, by developing a methanol reforming catalyst having a high activity, high durability and high selectivity to steam-reforming reaction.

Other objects of the present invention will become obvious from the text of this specification hereinafter disclosed.

SUMMARY OF THE INVENTION

As a result of intensive extensive research and investigation accumulated by the present inventors in order to achieve the objects as mentioned before, it has been found that a catalyst which comprises palladium, zinc and at least one metal selected from the group consisting of chromium, gallium, copper, indium, bismuth and platinum is well suited for use in an auto thermal reactor and that the durability thereof is improved. The present invention has been accomplished by the above-mentioned findings and information.

That is to say, the present invention provides a process for producing a hydrogen-containing gas, which comprises reacting methanol, steam and oxygen in the presence of a catalyst comprising palladium, zinc and at least one metal selected from the group consisting of chromium, gallium, copper, indium, bismuth and platinum.

The process for producing a hydrogen-containing gas according to the present invention can be put into practice by any of the following processes.

(I) a process which comprises reacting methanol, steam and oxygen in the presence of a catalyst comprising palladium, zinc, and either or both of chromium and gallium.

(II) a process which comprises reacting methanol, steam and oxygen in the presence of a catalyst comprising palladium, zinc, copper and chromium.

(III) a process which comprises reacting methanol, steam and oxygen in the presence of a catalyst comprising palladium and zinc, or chromium added thereto optionally, and either or both of indium and bismuth.

(IV) a process which comprises reacting methanol, steam and oxygen in the presence of a catalyst comprising palladium, zinc oxide and platinum.

DESCRIPTION OF THE PREFERRED EMBODIMENTS

The source of palladium contained in the catalyst to be used in the process for producing a hydrogen-containing gas according to the present invention is not specifically limited. There are usable as the source of palladium, for instance, palladium nitrate, palladium acetate, palladium chloride, dinitrodiammine palladium and the like. Of these, palladium nitrate, palladium acetate and palladium chloride are preferably used.

Zinc oxide available on the market is usable as zinc contained in the catalyst to be used in the process for producing a hydrogen-containing gas according to the present invention. In addition, there are also usable as a zinc source, such zinc compounds that form zinc oxide after calcining or reducing or during reaction, including a salt of an organic acid or an inorganic acid such as zinc acetate and zinc nitrate, zinc hydroxide and basic zinc carbonate. For instance, zinc oxide is obtainable by calcining the precipitate obtained by treating aqueous solution of a zinc salt of an organic acid or an inorganic acid with a precipitant.

The source of chromium contained in the catalyst is not specifically limited provided that it can be made into chromium oxide upon completion of catalyst preparation. There is usable as the source of chromium, for instance, a water-soluble salt of an organic acid or an inorganic acid such as chromium acetate and chromium nitrate. In this case, chromium oxide is obtainable by calcining the precipitate obtained by treating aqueous solution of the above-cited chromium compound with a precipitant, The source of gallium contained in the catalyst is not specifically limited provided that it can be made into gallium oxide upon completion of catalyst preparation. There are usable as the source of gallium, for instance, gallium hydroxide, gallium oxide, gallium nitrate and the like.

As the source of copper, there is usable for instance, a water-soluble salt of an organic acid or an inorganic acid such as copper acetate, copper sulfate and copper nitrate.

As the source of indium, there is usable for instance, a salt of an organic acid or an inorganic acid such as indium acetate and indium nitrate.

As the source of bismuth, there is usable for instance, an inorganic acid salt such as bismuth nitrate.

As the source of platinum, there are usable platinum oxide, chloroplatinic acid, an alkali metal salt thereof, acetylacetonato platinum, dinitrodiammine platinum and the like. In the case of preparing a catalyst by dissolving in water, it is preferable to employ chloroplatinic acid or an alkali metal salt thereof.

With regard to the chemical composition of the catalyst to be used in the process (I) comprising palladium, zinc, and either or both of chromium and gallium, the atomic ratio of palladium/zinc is in the range of 0.004 to 2.2, preferably 0.04 to 0.6, and the atomic ratio of (the sum of chromium and gallium)/zinc is in the range of 0.03 to 2, preferably 0.05 to 1.

A method for preparing the catalyst in the process (I) is not specifically limited provided that the method allows the metallic palladium, zinc oxide, and either or both of chromium oxide and gallium oxide to coexist. There are available, for instance, (1) a method (coprecipitation method) comprising simultaneously forming a precipitate from the mixed solution of a water-soluble compounds of palladium, zinc, chromium and gallium, respectively along with a precipitant; (2) a method comprising mixing the slurry in which zinc oxide, zinc hydroxide, basic zinc carbonate or the like is dispersed with a solution of compounds of palladium, chromium and gallium, respectively, and adding a precipitant or a reducing agent to the resultant mixture to deposit components of palladium, chromium and gallium, respectively; and (3) a method comprising preparing a composition composed principally of palladium and zinc oxide through coprecipitation method or the like, and impregnating a chromium compound and a gallium compound into the resultant composition; (4) a method comprising preparing a composition composed principally of palladium and zinc oxide through coprecipitation method or the like, mixing the slurry wherein the resultant composition is dispersed with a solution of a chromium compound and a gallium compound, and adding a precipitant to the resultant mixture to deposit components of chromium and gallium; and (5) a method comprising preparing a composition composed principally of zinc, chromium and gallium through coprecipitation method or the like, mixing the slurry wherein the resultant composition is dispersed with a solution of a palladium compound, and adding a precipitant or reducing agent to the resultant mixture to deposit a palladium component; and the like method.

As a precipitant to be used in the preparation of the catalyst, use is made of an alkali compound such as sodium hydroxide, potassium hydroxide, sodium carbonate, potassium carbonate and sodium hydrogencarbonate. The amount of the precipitant to be used therein is one to 2 times, preferably 1.1 to 1.6 times the chemical equivalent weight. The temperature at the time of preparing a precipitate is 20 to 90° C., preferably 35 to 85° C. It is preferable to wash the precipitate obtained by precipitation method with ion-exchanged water, distilled water or the like.

The resultant slurry obtained by the above-mentioned method is dried or dried/calcined, crushed, uniformized in size or molded, and then put into service. It is also possible to support the intact slurry thus obtained on a carrier or a carrier structure, or to add a binder such as alumina sol thereto at need, and thereafter support the binder-treated slurry thereon. In this case it is possible to use the supported catalyst after drying and as such or after drying and calcining.

The drying temperature is preferably in the range of 50 to 150° C. The calcination is carried out in air at a temperature in the range of 180 to 700° C., preferably 200 to 600° C.

A method for preparing the catalyst to be used in the process (II) (comprising palladium, copper, zinc and chromium) is not specifically limited provided that palladium, copper, zinc oxide and chromium oxide are each made to be a principal ingredient. For instance, the catalyst is prepared by depositing and precipitating palladium and copper in a composition composed principally of a zinc compound and a chromium compound, and drying calcining the resultant precipitate. The type and amount of the precipitant to be used therein and drying calcining method are same as those in the above-mentioned method (I).

With regard to the chemical composition of the catalyst to be used in the process (II), the atomic ratio of chromium/zinc is in the range of 0.03 to 2, preferably 0.05 to 1, the atomic ratio of palladium/zinc is in the range of 0.004 to 2.2, preferably 0.04 to 0.6, and the atomic ratio of copper/zinc is in the range of 0.01 to 1.6, preferably 0.05 to 0.6.

As a method for preparing the catalyst to be used in the process (III) (comprising palladium and zinc, or chromium added thereto optionally, and either or both of indium and bismuth), there are usable well known methods such as impregnation method, deposition-precipitation method, coprecipitation method and the like methods provided that (1) the system of metallic palladium, zinc oxide, indium oxide and bismuth oxide or (2) the system of metallic palladium, zinc oxide, chromium oxide, indium oxide and bismuth oxide is contained in the reaction system in a closely mixed state.

There are available, for instance, (A) a method (deposition-precipitation method) comprising treating with a precipitant, (1) a mixed aqueous solution containing a water-soluble zinc salt, an indium salt and a bismuth salt or (2) a mixed aqueous solution containing a water-soluble zinc salt, a chromium salt, an indium salt and a bismuth salt to obtain a precipitate, drying and calcining the resultant precipitate, thereafter mixing the suspension of the calcined product with a solution of a soluble palladium salt, adding a precipitant to the resultant mixture to deposit and precipitate the mixture, and drying calcining the deposited precipitate; and (B) a method (coprecipitation method) comprising treating with a precipitant, (1) a mixed aqueous solution containing a water-soluble palladium salt, a zinc salt, an indium salt and a bismuth salt or (2) a mixed aqueous solution containing a water-soluble palladium salt, a zinc salt, a chromium salt, an indium salt and a bismuth salt to obtain a precipitate, drying and calcining the resultant precipitate, and the like methods. The type and amount of the precipitant to be used therein and drying calcining method are same as those in the above-mentioned method (I).

With regard to the chemical composition of the catalyst to be used in the process (III), the atomic ratio of palladium/zinc is in the range of 0.004 to 2.2, preferably 0.04 to 0.6, the atomic ratio of chromium/zinc is in the range of 0.03 to 2, preferably 0.05 to 1, the atomic ratio of indium/zinc is in the range of 0.025 to 2. , preferably 0.03 to 1, and the atomic ratio of bismuth/zinc is in the range of 0.0025 to 20, preferably 0.003 to 1.

A method for preparing the catalyst (comprising zinc oxide, palladium and platinum) in the process (IV) is not specifically limited provided that the method allows the zinc oxide, palladium and platinum to coexist. There are available, for instance, (1) a method (coprecipitation method) comprising simultaneously forming a precipitate from the mixed solution of a water-soluble compounds of zinc, platinum and palladium, respectively along with a precipitant; (2) a method comprising mixing the slurry in which zinc oxide or zinc hydroxide or basic zinc carbonate is dispersed with a solution of compounds of platinum and palladium, respectively, and adding a precipitant or a reducing agent to the resultant mixture to deposit components of platinum and palladium, respectively; and (3) a method comprising impregnating a palladium compound and a platinum compound into zinc oxide or zinc hydroxide or basic zinc carbonate. The type and amount of the precipitant to be used therein and drying calcining method are same as those in the above-mentioned method (I).

With regard to the chemical composition of the catalyst to be used in the process (IV) expressed in terms of the percentage of the number of metallic atoms based on the number of the total metallic atoms and oxygen constituting the catalyst, there are contained zinc in 10 to 50%, preferably 20 to 50%, platinum in 0.01 to 30%, preferably 0.1 to 24% and palladium in 0.01 to 40%, preferably 0.05 to 30%. The ratio of palladium to platinum is not specifically limited, but can be optimized in accordance with the durability of the catalyst, performance required of the production process such as carbon monoxide concentration in the outlet gas and reaction conditions.

With regard to the auto thermal system reaction wherein methanol, steam and air are reacted, an activation treatment may be carried out, for instance, with hydrogen, carbon monoxide-containing gas or the like as is the case with the steam-reforming reaction. It is also possible to proceed with the reaction without such an activation treatment.

The reaction conditions in the case of reacting methanol, steam and air are such that a molar ratio of steam to methanol is 1 to 10 mol, preferably 1 to 5 mol, a molar ratio of air to methanol is 0.3 to 5.0 mol, preferably 0.5 to 3.0 mol, a reaction temperature is in the range of 150 to 600° C., preferably 200 to 500° C., a reaction pressure is at most 0.5 MPa·G, preferably in the range of atmospheric pressure to 0.5 MPa, and a liquid hourly space velocity (LHSV) of methanol per unit volume of catalyst used is 0.1 to 120 $h^{-1}$, preferably 0.5 to 100 $h^{-1}$.

In summarizing the working effects and advantages of the methanol-reforming reaction according to the present invention, it is made possible by the use of the specific catalyst to improve the durability of the catalyst in the process (I), the durability of the catalyst and selectivity (lowering of carbon monoxide concentration) in the process (II), selectivity in the process (III) and the durability thereof along with its suitability for use in an auto thermal reformer in the process (IV). Accordingly the process according to the present invention enables the production of a hydrogen-containing gas in an industrially advantageous manner.

In what follows, the present invention will be described in more detail with reference to comparative examples and working examples, which however shall never limit the present invention thereto.

In the following comparative examples and working examples, reactivity of methanol and selectivity to carbon monoxide were determined from the chemical composition of the gas at the outlet of the reactor.

Methanol conversion (%)=([CO]+[$CO_2$])/([CO]+[$CO_2$]+[$CH_3OH$])×100

Selectivity to carbon monoxide (%)=[CO]/([CO]+[$CO_2$])×100

In the formulae, [CO], [$CO_2$] and [$CH_3OH$] are molar concentration of CO, $CO_2$ and $CH_3OH$, respectively in the gas at the outlet of the reactor.

<Process (I)>
{Preparation of Catalyst}
Catalyst A-1

Sodium carbonate anhydride in an amount of 204 g and 200 milliliter(mL) of ion-exchanged water were placed in a 5 liter round bottom flask to dissolve the sodium carbonate, and adjusted to a temperature of 40° C. To the resultant solution was added a solution of 26 g of palladium nitrate 1.9-hydrate, 298 g of zinc nitrate hexahydrate and 100 g of chromium nitrate nonahydrate that were dissolved in 1000 mL of ion-exchanged water, while the solution was adjusted to 40° C., followed by stirring for 30 minutes to prepare slurry. The resultant slurry was filtered to form a cake, which was washed with 12 liter of ion-exchanged water.

Subsequently the washed cake was dried at a temperature of 80° C., and then was calcined at 380° C. for 2 hours in air to obtain a catalyst of Pd—Zn—Cr. The resultant catalyst was wet crushed, mixed with alumina sol to be made into slurry. Subsequently, there were repeated the steps of immersing a honeycomb (400 cells/square inch) made of cordierite (cordierite porcelain) into the slurried catalyst, blowing off an excess amount and drying so that the catalyst was supported thereon in a catalyst amount of 200 g/L on a dry base. It was designated as Catalyst A-1 having a chemical composition expressed in terms of atomic ratio of Pd/Zn/Cr being 0.1/1.0/0.25.

Catalyst B-1

Sodium carbonate anhydride in an amount of 138 g and 1000 mL of ion-exchanged water were placed in a 5 liter round bottom flask to dissolve the sodium carbonate, and the resultant solution was adjusted to a temperature of 60° C. To the resultant solution was added a solution of 238 g of zinc nitrate hexahydrate and 80 g of chromium nitrate nonahydrate that were dissolved in 800 mL of ion-exchanged water, while the solution was adjusted to 60° C., followed by stirring for 30 minutes to prepare slurry. The resultant slurry was filtered to form a cake, which was washed with 12 liter of ion-exchanged water. Subsequently the washed cake was dried at a temperature of 80° C., and then was calcined at 380° C. for 2 hours in air to obtain Zn—Cr oxide.

The resultant 100 g of Zn—Cr oxide and 1000 mL of ion-exchanged water were placed in a 5 liter round bottom flask to disperse the Zn—Cr oxide, and adjusted to a temperature of 40° C. Subsequently to the resultant dispersion were added a solution of 26 g of palladium nitrate 1.9-hydrate dissolved in 2000 mL of ion-exchanged water, while the solution was adjusted to 40° C., and 50 mL of aqueous solution of 20% by weight of sodium carbonate, followed by stirring for 30 minutes to prepare slurry. The resultant slurry was filtered to form a cake, which was washed with 12 liter of ion-exchanged water. Subsequently the washed cake was dried at a temperature of 80° C., and then was calcined at 380° C. for 2 hours in air to obtain a catalyst of Pd—Zn—Cr.

In the same manner as in Catalyst A-1, the catalyst of Pd—Zn—Cr was supported on a honeycomb (400 cells/square inch) made of cordierite so as to be supported in a catalyst amount of 200 g/L on a dry base. It was designated as Catalyst B-1 having a chemical composition expressed in terms of atomic ratio of Pd/Zn/Cr being 0.11/1.0/0.25.

Catalyst C-1

In the same manner as in Catalyst B-1, a catalyst of Pd—Zn—Cr was prepared except that Pd/Zn ratio was set on 0.05. In the same manner as in Catalyst A-1, the catalyst of Pd—Zn—Cr was supported on a honeycomb (400 cells/square inch) made of cordierite so as to be supported in a catalyst amount of 200 g/L on a dry base. It was designated as Catalyst C-1 having a chemical composition expressed in terms of atomic ratio of Pd/Zn/Cr being 0.05/1.0/0.25.

Catalyst D-1

In the same manner as in Catalyst B-1, a catalyst of Pd—Zn—Cr was prepared except that Pd/Zn ratio was set on 0.24. In the same manner as in Catalyst A-1, the catalyst of Pd—Zn—Cr was supported on a honeycomb (400 cells/square inch) made of cordierite so as to be supported in a catalyst amount of 200 g/L on a dry base. It was designated as Catalyst D-1 having a chemical composition expressed in terms of atomic ratio of Pd/Zn/Cr being 0.24/1.0/0.25.

Catalyst E-1

Zinc oxide in an amount of 15 g was dispersed in 500 mL of ion-exchanged water, and the dispersion was adjusted to a temperature of 35° C. To the resultant dispersion were added under stirring, an aqueous solution of 4.17 g of palladium nitrate dihydrate dissolved in 500 mL of ion-exchanged water which solution had been adjusted to a temperature of 35° C., and 35 mL of 1 N aqueous solution of potassium hydroxide, followed by continuous stirring for 1 hour to form a precipitate. The resultant precipitate was filtered to form a cake, which was washed with 4 liter of ion-exchanged water. Subsequently the washed cake was dispersed in 500 mL of ion-exchanged water, and adjusted to a temperature of 35° C. To the resultant dispersion were added an aqueous solution of 5.26 g of gallium nitrate hydrate dissolved in 500 mL of ion-exchanged water which solution had been adjusted to a temperature of 35° C., 37 mL of 1 N aqueous solution of potassium hydroxide, followed by continuous stirring for 1 hour to form a precipitate. The resultant precipitate was dried, and then was calcined to obtain a catalyst of Pd—Zn—Ga. The resultant catalyst was wet crushed, and mixed with alumina sol to be made into slurry.

Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst D-1 having a chemical composition expressed in terms of atomic ratio of Pd/Zn/Ga being 0.08/1.0/0.07.

Catalyst F-1

Potassium carbonate in an amount of 34.5 g was dissolved in 500 mL of ion-exchanged water, and the solution was adjusted to a temperature of 60° C. To the resultant solution was gradually added under stirring, an aqueous solution of 57.6 g of zinc nitrate hexahydrate and 5.53 g of gallium nitrate nonahydrate that were dissolved in 500 mL of ion-exchanged water which solution had been adjusted to a temperature of 60° C., followed by continuous stirring for 1 hour, while keeping the temperature at 60° C. to form a precipitate. The resultant precipitate was filtered to form a cake, which was washed with 4 liter of ion-exchanged water.

Subsequently the washed cake was dried, and then was calcined to obtain a zinc-gallium compound. The resultant compound was crushed, dispersed in in 500 mL of ion-exchanged water, and adjusted to a temperature of 35° C. to form slurry. To the resultant slurry were added under stirring, an aqueous solution of 4.17 g of palladium nitrate dihydrate dissolved in 500 mL of ion-exchanged water which solution had been adjusted to a temperature of 35° C., and then 35 mL of 1 N aqueous solution of potassium hydroxide, followed by continuous stirring for 1 hour to form a precipitate. The resultant precipitate was filtered to form a cake, which was washed with 4 liter of ion-exchanged water. Subsequently the washed cake was dried, and thereafter was calcined to obtain a catalyst of Pd—Zn—Ga.

The resultant catalyst was wet crushed, and mixed with alumina sol to be made into slurry. Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst F-1 having a chemical composition expressed in terms of atomic ratio of Pd/Zn/Ga being 0.09/1.0/0.07.

Catalyst G-1

Zinc oxide in an amount of 15 g and 500 mL of ion-exchanged water were placed in a 2 liter beaker to disperse zinc oxide. To the resultant dispersion were added an aqueous solution of 4.3 g of palladium nitrate 2.3-hydrate dissolved in 500 mL of ion-exchanged water, and 32 mL of 1 N aqueous solution of potassium hydroxide, followed by stirring for 30 minutes to form slurry. The resultant slurry was filtered to form a cake, which was washed with 5 liter of ion-exchanged water. Subsequently the washed cake was dried, and then was calcined to obtain a catalyst of Pd—Zn.

In the same manner as in Catalyst A-1, the catalyst of Pd—Zn was supported on a honeycomb (400 cells/square inch) made of cordierite so as to be supported in a catalyst amount of 200 g/L on a dry base. It was designated as Catalyst G-1 having a chemical composition expressed in terms of atomic ratio of Pd/Zn being 0.09/1.0.

Catalyst H-1

Zinc oxide in an amount of 15 g was dispersed in 500 mL of ion-exchanged water, and the dispersion was adjusted to a temperature of 35° C. To the resultant dispersion were added under stirring, an aqueous solution of 4.17 g of palladium nitrate dihydrate dissolved in 500 mL of ion-exchanged water which solution had been adjusted to a temperature of 35° C., and 35 mL of 1 N aqueous solution of potassium hydroxide, followed by continuous stirring for 1 hour to form a precipitate. The resultant precipitate was filtered to form a cake, which was washed with 4 liter of ion-exchanged water.

Subsequently the washed cake was dried, and then was calcined to obtain a catalyst of Pd—Zn. The resultant catalyst was wet milled, and mixed with alumina sol to be made into slurry. Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst H-1 having a chemical composition expressed in terms of atomic ratio of Pd/Zn being 0.085/1.0.

Catalyst I-1

Gallium oxide ($Ga_2O_3$) in an amount of 15 g was dispersed in 500 mL of ion-exchanged water, and the dispersion was adjusted to a temperature of 35° C. To the resultant dispersion were added under stirring, an aqueous solution of 4.17 g of palladium nitrate dihydrate dissolved in 500 mL of ion-exchanged water which solution had been adjusted to a temperature of 35° C., and 35 mL of 1 N aqueous solution of potassium hydroxide, followed by continuous stirring for 1 hour to form a precipitate. The resultant precipitate was filtered to form a cake, which was washed with 4 liter of ion-exchanged water. Subsequently the washed cake was dried, and then was calcined to obtain a catalyst of Pd—Ga. The resultant catalyst was wet crushed, and mixed with alumina sol to be made into slurry. Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst I-1 having a chemical composition expressed in terms of atomic ratio of Pd/Ga being 0.1/1.0.

{Methanol Reforming Reaction}

EXAMPLES 1 to 2 AND COMPARATIVE EXAMPLE 1

Any of the catalysts A-1, B-1 and G-1, prior to activity evaluation, was subjected to a reduction treatment at 200° C. at an LHSV (liquid hourly space velocity) of methanol of 5 $hr^{-1}$. Thereafter an aqueous solution of methanol having a water/methanol ratio of 1.5 was introduced in a evaporator at an LHSV of methanol of 15 $hr^{-1}$ instead of 5 $hr^{-1}$. Air was mixed in evaporated water/methanol on the downstream side of the evaporator outlet, and the temperature in the introduction line leading to a catalyst bed was regulated so that the mixed water/methanol vapor was charged in the catalyst bed at 200° C. The reaction of water/methanol was carried out at an air/methanol ratio of 0.9 to 1.2. The chemical composition of the gas after the reaction was analyzed by means of gas chromatography. The reactivity of methanol after a reaction time of zero hour (immediately after the start of reaction) and 40 hours is given in Table 1, and carbon monoxide concentration at the outlet of the catalyst bed after a reaction time of the same is given in Table 2.

TABLE 1

| Reaction time (Hr) | | 0 | 40 |
|---|---|---|---|
| Catalyst | | Methanol conversion (mol %) | |
| Example 1 | A-1(Pd—Zn—Cr) | 99.7 | 99.6 |
| Example 2 | B-1(Pd—Zn—Cr) | 99.4 | 99.4 |
| Comparative Example 1 | G-1(Pd—Zn) | 97.4 | 94.2 |

TABLE 2

| Reaction time (Hr) | | 0 | 40 |
|---|---|---|---|
| Catalyst | | CO concentration (mol %) | |
| Example 1 | A-1(Pd—Zn—Cr) | 1.41 | 1.33 |
| Example 2 | B-1(Pd—Zn—Cr) | 1.26 | 1.27 |
| Comparative Example 1 | G-1(Pd—Zn) | 0.90 | 3.07 |

As can be seen from Tables 1 and 2, both the catalysts A-1 and B-1, as compared with the catalyst G-1, are excellent in durability because of less change with the lapse of time regarding both Methanol reactivity and CO concentration.

EXAMPLES 3 TO 5 AND COMPARATIVE EXAMPLE 2

Any of the catalysts B-1, C-1, D-1 and G-1, prior to activity evaluation, was subjected to a reduction treatment at 200° C. at an LHSV of methanol of 5 $hr^{-1}$. Thereafter an aqueous solution of methanol having a water/methanol ratio of 1.5 was introduced in a evaporator at an LHSV of methanol of 87 $hr^{-1}$ instead of 5 $hr^{-1}$. Air was mixed in evaporated water/methanol on the downstream side of the evaporator outlet, and the temperature in the introduction line leading to the catalyst bed was regulated so that the mixed water/methanol vapor was charged therein at 200° C. The reaction of water/methanol was carried out at an air/methanol ratio of 0.9 to 1.2. The chemical composition of the gas after the reaction was analyzed by means of gas chromatography. The reactivity of methanol after a reaction time of zero hour and 40 hours is given in Table 3, and carbon monoxide concentration at the outlet of the catalyst bed after a reaction time of the same is given in Table 4.

TABLE 3

| Reaction time (Hr) | | 0 | 40 |
|---|---|---|---|
| Catalyst | | Methanol conversion (mol %) | |
| Example 3 | B-1(Pd—Zn—Cr) | 92.1 | 90.2 |
| Example 4 | C-1(Pd—Zn—Cr) | 90.0 | 87.8 |
| Example 5 | D-1(Pd—Zn—Cr) | 92.6 | 90.1 |
| Comparative Example 2 | G-1(Pd—Zn) | 92.7 | 85.9 |

TABLE 4

| Reaction time (Hr) | | 0 | 40 |
|---|---|---|---|
| Catalyst | | CO concentration (mol %) | |
| Example 3 | B-1(Pd—Zn—Cr) | 1.67 | 1.64 |
| Example 4 | C-1(Pd—Zn—Cr) | 1.73 | 1.76 |
| Example 5 | D-1(Pd—Zn—Cr) | 1.55 | 1.52 |
| Comparative Example 2 | G-1(Pd—Zn) | 1.54 | 2.31 |

As can be seen from Tables 3 and 4, the catalysts B-1, C-1 and D-1, as compared with the catalyst G-1, are excellent in durability because of less change with the lapse of time regarding both Methanol reactivity and CO concentration.

EXAMPLES 6 TO 7 AND COMPARATIVE EXAMPLES 3 TO 4

Any of the catalysts E-1, F-1, H-1 and I-1 was packed in a reactor and, prior to activity evaluation, was subjected to a reduction treatment at 200° C. at an LHSV of methanol of 15 $hr^{-1}$. Thereafter an aqueous solution of methanol having a water/methanol ratio of 1.5 was introduced in a evaporator at an LHSV unchanged. Air was mixed in evaporated water/methanol on the downstream side of the evaporator outlet, and the temperature in the introduction line leading to the catalyst bed was regulated so that the mixed water/methanol vapor was charged therein at 200° C. The reaction of water/methanol was regulated so that the temperature at the inlet of the catalyst bed was made to be 400° C. The chemical composition of the gas after the reaction was analyzed by means of gas chromatography. As the results of the reaction, the reactivity of methanol is given in Table 5, and carbon monoxide concentration at the outlet of the catalyst bed is given in Table 6.

TABLE 5

| Reaction time (Hr) Catalyst | 0 | 50 | 100 | 150 |
|---|---|---|---|---|
| | Methanol conversion (mol %) | | | |
| Example 6 E-1(Pd—Zn—Ga) | 97.9 | 95.9 | 93.8 | 92.0 |
| Example 7 F-1(Pd—Zn—Ga) | 98.6 | 95.5 | 94.6 | 94.1 |
| Comparative Example 3 H-1(Pd—Zn) | 95.7 | 92.1 | 88.4 | 84.0 |
| Comparative Example 4 I-1(Pd—Ga) | 91.8 | 89.0 | 85.2 | 80.4 |

TABLE 6

| Reaction time (Hr) Catalyst | 0 | 50 | 100 | 150 |
|---|---|---|---|---|
| | C0 concentration (mol %) | | | |
| Example 6 E-1(Pd—Zn—Ga) | 1.6 | 1.4 | 1.7 | 1.9 |
| Example 7 F-1(Pd—Zn—Ga) | 1.4 | 1.3 | 1.4 | 1.3 |
| Comparative Example 3 H-1(Pd—Zn) | 1.1 | 1.3 | 1.6 | 2.0 |
| Comparative Example 4 I-1(Pd—Ga) | 15.6 | 15.4 | 15.1 | 14.9 |

<Process (II)>
{Preparation of Catalyst}
Catalyst A-2

Sodium carbonate anhydride in an amount of 138 g and 1000 mL of ion-exchanged water were placed in a 5 liter round bottom flask to dissolve the sodium carbonate, and solution was adjusted to a temperature of 60° C. To the resultant solution was added a solution of 238 g of zinc nitrate hexahydrate and 80 g of chromium nitrate nonahydrate that were dissolved in 800 mL of ion-exchanged water, while the solution was adjusted to 60° C., followed by stirring for 30 minutes to prepare slurry. The resultant slurry was filtered to form a cake, which was washed with 12 liter of ion-exchanged water.

Subsequently the washed cake was dried at a temperature of 80° C., and then was calcined at 380° C. for 2 hours in air to obtain a Zn—Cr oxide. The resultant 100 g of the Zn—Cr oxide and 1000 mL of ion-exchanged water were placed in a 5 liter round bottom flask to disperse the Zn—Cr oxide, and adjusted to a temperature of 60° C. Then, to the resultant dispersion were added a solution of 26 g of palladium nitrate 2.5-hydrate and 19 g of copper nitrate trihydrate that were dissolved in 2000 mL of ion-exchanged water, while the solution was adjusted to 60° C., and 95 mL of aqueous solution of 20% by weight of sodium carbonate, followed by stirring for 30 minutes to prepare slurry. The resultant slurry was filtered to form a cake, which was washed with 12 liter of ion-exchanged water.

Subsequently the washed cake was dried at a temperature of 80° C., and then was calcined at 380° C. for 2 hours in air to obtain a catalyst of Pd—Cu—Zn—Cr. The resultant catalyst of Pd—Cu—Zn—Cr was wet crushed, and mixed with alumina sol to be made into slurry. Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst A-2 having a chemical composition expressed in terms of atomic ratio of Pd/Cu/Zn/Cr being 0.11/0.09/1.0/0.25.

Catalyst B-2
In the same manner as in the Catalyst G-1, a catalyst was prepared. It was designated as Catalyst B-2.

Catalyst C-2
In the same manner as in the Catalyst A-2, a Zn—Cr oxide was obtained. The resultant 100 g of the Zn—Cr oxide and 1000 mL of ion-exchanged water were placed in a 5 liter round bottom flask to disperse the Zn—Cr oxide, and adjusted to a temperature of 60° C. Subsequently to the resultant dispersion were added a solution of 26 g of palladium nitrate 1.9-hydrate dissolved in 2000 mL of ion-exchanged water, while the solution was adjusted to 60° C., and 95 mL of aqueous solution of 20% by weight of sodium carbonate, followed by stirring for 30 minutes to prepare slurry. The resultant slurry was filtered to form a cake, which was washed with 12 liter of ion-exchanged water. Subsequently the washed cake was dried at a temperature of 80° C., and then was calcined at 380° C. for 2 hours in air to obtain a catalyst of Pd—Zn—Cr.

In the same manner as in Catalyst A-2, the catalyst of Pd—Zn—Cr was supported on a honeycomb (400 cells/square inch) made of cordierite so as to be supported in a catalyst amount of 200 g/L on a dry base. It was designated as Catalyst C-2 having a chemical composition expressed in terms of atomic ratio of Pd/Zn/Cr being 0.11/1.0/0.25.

{Methanol Reforming Reaction}

EXAMPLE 8 AND COMPARATIVE EXAMPLES 5 TO 6

Any of the catalysts A-2, B-2 and C-2, prior to activity evaluation, was subjected to a reduction treatment at 200° C. at an LHSV of methanol of 5 hr$^{-1}$. Thereafter an aqueous solution of methanol having a water/methanol ratio of 1.5 was introduced in a evaporator at an LHSV of methanol of 22 hr$^{-1}$ instead of 5 hr$^{-1}$. Air was mixed in evaporated water/methanol on the downstream side of the evaporator outlet, and the temperature in the introduction line leading to the catalyst bed was regulated so that the mixed water/methanol vapor was charged therein at 200° C. The reaction of water/methanol was carried out at an air/methanol ratio of 0.8 to 1.2. The chemical composition of the gas after the reaction was analyzed by means of gas chromatography. The reactivity of methanol after a reaction time of zero hour (immediately after the start of reaction) and 100 hours is given in Table 7, and carbon monoxide concentration at the outlet of the catalyst bed after a reaction time of the same is given in Table 8.

TABLE 7

| Reaction time (Hr) Catalyst | 0 | 100 |
|---|---|---|
| | Methanol conversion (mol %) | |
| Example 8 A-2(Pd—Cu—Zn—Cr) | 90.0 | 87.5 |
| Comparative Example 5 B-2(Pd—Zn) | 89.6 | 76.2 |
| Comparative Example 6 C-2(Pd—Zn—Cr) | 89.2 | 87.1 |

TABLE 8

| Reaction time (Hr) Catalyst | 0 | 100 |
|---|---|---|
| | CO concentration (mol %) | |
| Example 8 A-2(Pd—Cu—Zn—Cr) | 1.71 | 1.02 |
| Comparative Example 5 B-2(Pd—Zn) | 1.80 | 5.13 |
| Comparative Example 6 C-2(Pd—Zn—Cr) | 2.81 | 2.42 |

As can be seen from Tables 7 and 8, the catalyst A-2, as compared with the catalysts B-2 and C-2, exhibits low CO concentration and high selectivity and is excellent in durability because of less change with the lapse of time regarding both methanol conversion and CO concentration.

<Process (III)>
{Preparation of Catalyst}
Catalyst A-3

Sodium carbonate anhydride in an amount of 31 g and 1000 mL of ion-exchanged water were placed in a 2 liter beaker to dissolve sodium carbonate. To the resultant solution was added a solution of 62 g of zinc nitrate hexahydrate and 8 g of indium nitrate trihydrate that were dissolved in 800 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a Zn—In oxide.

Subsequently, 4 g of palladium nitrate 2.2-hydrate and 800 mL of ion-exchanged water were placed in a 1 liter beaker to dissolve the same. To the resultant solution was added a dispersion of 15 g of the above-prepared Zn—In oxide in 200 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a catalyst of Pd—Zn—In.

The resultant catalyst was wet crushed by means of a ball mill, and mixed with alumina sol in an amount of 4% by weight as a binder to be made into slurry. Subsequently there were repeated the steps of immersing a cordierite-made honeycomb having a diameter of 25 mm, a length of 5 mm and 400 cells/square inch into the resultant slurried catalyst, blowing off an excess amount, and drying so that the catalyst was supported thereon in a catalyst amount of 0.5 g on a dry base. It was designated as Catalyst A-3 having a chemical composition expressed in terms of atomic ratio of Pd/Zn/In being 0.10/1.0/0.11.

Catalyst B-3

Sodium carbonate anhydride in an amount of 32 g and 1000 mL of ion-exchanged water were placed in a 2 liter beaker to dissolve sodium carbonate. To the resultant solution was added 800 mL of mixed solution composed of a solution of 55 g of zinc nitrate hexahydrate dissolved in 500 mL of ion-exchanged water and a solution of 22 g of bismuth nitrate pentahydrate dissolved in 300 mL of 2 mol/L aqueous solution of nitric acid, followed by stirring for 30 minutes to prepare slurry. The resultant slurry was filtered to form a cake, which was washed with 4 liter of ion-exchanged water. Thereafter, the washed cake was dried at a temperature of 80° C., and then was calcined at 380° C. for 2 hours in air to obtain a Zn—Bi oxide.

Subsequently, 1 g of palladium nitrate 2.2-hydrate and 800 mL of ion-exchanged water were placed in a 1 liter beaker to dissolve palladium nitrate. To the resultant solution was added a dispersion of 11 g of the above-prepared Zn—Bi oxide in 200 mL of ion-exchanged water, followed by stirring for 30 minutes to prepare slurry. The resultant slurry was filtered to form a cake, which was washed with 3 liter of ion-exchanged water. The washed cake was dried at a temperature of 80° C., and then was calcined at 380° C. for 2 hours in air to obtain a catalyst of Pd—Zn—Bi.

Subsequently in the same manner as in the Catalyst A-3, the catalyst of Pd—Zn—Bi thus prepared was supported on a cordierite-made honeycomb. It was designated as Catalyst B-3 having a chemical composition expressed in terms of atomic ratio of Pd/Zn/Bi being 0.15/1.0/0.25.

Catalyst C-3

Sodium carbonate anhydride in an amount of 40 g and 1000 mL of ion-exchanged water were placed in a 2 liter beaker to dissolve sodium carbonate. To the resultant solution was added a solution of 6 g of palladium nitrate 2.2-hydrate, 55 g of zinc nitrate hexahydrate, 18 g of chromium nitrate nonahydrate and 8 g of indium nitrate trihydrate that were dissolved in 800 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a catalyst of Pd—Zn—Cr—In. Subsequently in the same manner as in the Catalyst A-3, the catalyst of Pd—Zn—Cr—In was supported on a cordierite-made honeycomb. It was designated as Catalyst C-3 having a chemical composition expressed in terms of atomic ratio of Pd/Zn/Cr/In being 0.12/1.0/0.25/0.125.

Catalyst D-3

Sodium carbonate anhydride in an amount of 39 g and 1000 mL of ion-exchanged water were placed in a 2 liter beaker to dissolve sodium carbonate. To the resultant solution was added 800 mL of mixed solution composed of a solution of 5 g of palladium nitrate 2.2-hydrate, 55 g of zinc nitrate hexahydrate and 18 g of chromium nitrate nonahydrate that were dissolved in 770 mL of ion-exchanged water and a solution of 1 g of bismuth nitrate pentahydrate dissolved in 30 mL of 2 mol/L aqueous solution of nitric acid, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a catalyst of Pd—Zn—Cr—Bi.

Subsequently in the same manner as in the Catalyst A-3, the catalyst of Pd—Zn—Cr—Bi was supported on a cordierite-made honeycomb. It was designated as Catalyst D-3 having a chemical composition expressed in terms of atomic ratio of Pd/Zn/Cr/Bi being 0.11/1.0/0.25/0.0125

Catalyst E-3

Zinc oxide available from Seido Chemical Industries Co., Ltd. under the trade name "AZO" in an amount of 15 g was calcined at 380° C. for 2 hours. The calcined zinc oxide and 500 mL of ion-exchanged water were placed in a 1 liter beaker to disperse the same. To the resultant dispersion was added a solution of 4 g of palladium nitrate 2.5-hydrate dissolved in 500 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a catalyst of Pd—Zn.

Subsequently in the same manner as in the Catalyst A-3, the catalyst of Pd—Zn was supported on a cordierite-made honeycomb. It was designated as Catalyst E-3 having a chemical composition expressed in terms of atomic ratio of Pd/Zn being 0.085/1.0.

Catalyst F-3

Sodium carbonate anhydride in an amount of 35 g and 1000 mL of ion-exchanged water were placed in a 2 liter beaker to dissolve sodium carbonate. To the resultant solution was added 800 mL of a solution of 55 g of zinc nitrate hexahydrate and 18 g of chromium nitrate nonahydrate that were dissolved in 800 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a Zn—Cr oxide.

Subsequently, 4 g of palladium nitrate 2.2-hydrate and 800 mL of ion-exchanged water were placed in a 1 liter beaker to dissolve the same. To the resultant solution was added a dispersion of the above-prepared 15 g of Zn—Cr oxide in 200 mL of ion-exchanged water, followed by stirring for 30 minutes to prepare slurry. The resultant slurry was filtered to form a cake, which was washed with 3 liter of ion-exchanged water. Thereafter, the washed cake was dried at a temperature of 80° C., and then was calcined at 380° C. for 2 hours in air to obtain a catalyst of Pd—Zn—Cr.

Subsequently in the same manner as in the Catalyst A-3, the catalyst of Pd—Zn—Cr was supported on a cordierite-made honeycomb. It was designated as Catalyst F-3 having a chemical composition expressed in terms of atomic ratio of Pd/Zn/Cr being 0.10/1.0/0.25.

{Methanol Reforming Reaction}

EXAMPLES 9 TO 10 AND COMPARATIVE EXAMPLE 9

Any of the catalysts A-3, B-3, and E-3 was placed as a catalyst bed in a through flow system reactor. The catalyst activity was evaluated based on auto thermal system reaction by passing water/methanol/air through the reactor at a water/methanol ratio of 1.5, an LHSV of methanol of 87 hr$^{-1}$, a gas temperature at the inlet of the catalyst bed being 200° C. and an air/methanol ratio in the range of 0.9 to 1.3 under atmospheric pressure. The chemical composition of the gas after the reaction was analyzed by means of gas chromatography. In particular, durability tests of the catalysts were carried out by regulating the methanol reactivity in the initial stage to 90%. The reactivity of methanol after a reaction time of zero hour (immediately after the start of the reaction) and 40 hours is given in Table 9, and carbon monoxide concentration at the outlet of the catalyst bed after a reaction time of the same and selectivity to CO are given in Table 10.

TABLE 9

| | | Methanol conversion (mol %) after reaction time of | |
|---|---|---|---|
| | Catalyst | 0 hour | 40 hours |
| Example 9 | A-3(Pd—Zn—In) | 91.5 | 83.9 |
| Example 10 | B-3(Pd—Zn—Bi) | 93.6 | 84.4 |
| Comparative Example 9 | E-3(Pd—Zn) | 89.2 | 81.3 |

TABLE 10

| | | CO concentration (mol %) after reaction time of | |
|---|---|---|---|
| | Catalyst | 0 hour | 40 hours |
| Example 9 | A-3(Pd—Zn—In) | 0.71 | 0.62 |
| Example 10 | B-3(Pd—Zn—Bi) | 0.48 | 0.34 |
| Comparative Example 9 | E-3(Pd—Zn) | 1.14 | 3.30 |

As can be seen from Tables 9 and 10, both the catalysts A-3 and B-3, as compared with the catalyst E-3, are improved in selectivity to steam-reforming reaction of methanol, and exhibit low CO concentration in the hydrogen-containing gas obtained through the reforming process.

EXAMPLES 11 TO 12 AND COMPARATIVE EXAMPLE 10

Any of the catalysts C-3, D-3, and F-3 was placed as a catalyst bed in a through flow system reactor. The catalyst activity was evaluated based on auto thermal system reaction by passing water/methanol/air through the reactor at a water/methanol ratio of 1.5, an LHSV of methanol of 87 hr$^{-1}$, a gas temperature at the inlet of the catalyst bed being 200° C. and an air/methanol ratio in the range of 0.9 to 1.3 under atmospheric pressure. The chemical composition of the gas after the reaction was analyzed by means of gas chromatography. In particular, durability tests of the catalysts were carried out by regulating the methanol reactivity in the initial stage to 90%. The reactivity of methanol after a reaction time of zero hour (immediately after the start of the reaction) and 40 hours is given in Table 11. Carbon monoxide concentration at the outlet of the catalyst bed and selectivity to CO each after a reaction time of 0 and 40 hours are given in Table 12.

TABLE 11

| | | Methanol conversion (mol %) after reaction time of | |
|---|---|---|---|
| | Catalyst | 0 hour | 40 hours |
| Ex-11 | C-3(Pd—Zn—Cr—In) | 92.1 | 89.8 |
| Ex-12 | D-3(Pd—Zn—Cr—Bi) | 89.0 | 88.3 |
| Comp. Ex-10 | F-3(Pd—Zn—Cr) | 91.1 | 88.5 |

TABLE 12

| | | CO concentration (mol %) after reaction time of | |
|---|---|---|---|
| | Catalyst | 0 hour | 40 hours |
| Ex-11 | C-3(Pd—Zn—Cr—In) | 1.26 | 0.96 |
| Ex-12 | D-3(Pd—Zn—Cr—Bi) | 1.23 | 1.01 |
| Comp. Ex-10 | F-3(Pd—Zn—Cr) | 1.71 | 1.91 |

As can be seen from Tables 11 and 12, both the catalysts C-3 and D-3, as compared with the catalyst F-3, are improved in selectivity to steam-reforming reaction of methanol, and exhibit low CO concentration in the hydrogen-containing gas obtained through the reforming process.

<Process (IV)>

{Preparation of Catalyst}

Catalyst A-4

Zinc oxide in an amount of 15 g was dispersed in 500 mL of ion-exchanged water. Moreover, 500 mL of ion-exchanged water and 10 mL of 1 N hydrochloric acid were added to 1.77 g of potassium chloroplatinate and 1.38 g of palladium chloride to dissolve the two components, while adjusting the temperature of the resultant solution to 65° C. To the above-prepared dispersion of zinc oxide were added the aqueous solution of the potassium chloroplatinate and palladium chloride under stirring, and then 40 mL of 1 N aqueous solution of potassium hydroxide, while adjusting the temperature of the resultant mixture to 65° C. under continuous stirring for 1 hour to prepare slurry. The resultant slurry was filtered to form a cake, which was washed with 10 liter of ion-exchanged water. Subsequently the washed cake was dried at a temperature of 80° C., and then was calcined at 400° C. to obtain a catalyst of Pd—Pt—Zn (Pd/Pt: 1.8). The resultant catalyst of Pd—Pt—Zn was wet crushed, and mixed with alumina sol to be made into slurry.

Subsequently, there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst A-4 having a chemical composition expressed in terms of atomic ratio of Pd/Pt/Zn being 0.04/0.02/1.0.

Catalyst B-4

Zinc oxide in an amount of 15 g was dispersed in 500 mL of ion-exchanged water. Moreover, 500 mL of ion-exchanged water and 10 mL of 1 N hydrochloric acid were added to 0.89 g of potassium chloroplatinate and 2.08 g of palladium chloride to dissolve the two components, while adjusting the temperature of the resultant solution to 65° C. To the above-prepared dispersion of zinc oxide were added the aqueous solution of the potassium chloroplatinate and palladium chloride under stirring, and then 44 mL of 1 N aqueous solution of potassium hydroxide, while adjusting the temperature of the resultant mixture to 65° C. under continuous stirring for 1 hour to prepare slurry. The resultant slurry was filtered to form a cake, which was washed with 10 liter of ion-exchanged water. Thereafter the washed cake was dried at a temperature of 80° C., and then was calcined at 400° C. to obtain a catalyst of Pd—Pt—ZnO (Pd/Pt: 5.5). The resultant catalyst of Pd—Pt—Zn was wet crushed, and mixed with alumina sol to be made into slurry.

Subsequently, there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst B-4 having a chemical composition expressed in terms of atomic ratio of Pd/Pt/Zn being 0.06/0.01/1.0.

Catalyst C-4

Potassium carbonate in an amount of 29.5 g was dispersed in 500 mL of ion-exchanged water, and adjusted to a temperature of 65° C. Moreover, 500 mL of ion-exchanged water and 5 mL of 1 N hydrochloric acid were added to 54.8 g of zinc nitrate hexahydrate, 2.66 g of potassium chloroplatinate and 0.69 g of palladium chloride to dissolve the three components, while adjusting the temperature of the resultant solution to 65° C. To the above-prepared solution of potassium carbonate was added the aqueous solution of the zinc nitrate, potassium chloroplatinate and palladium chloride under stirring, followed by continuous stirring for 1 hour to prepare slurry. The resultant slurry was filtered to form a cake, which was washed with 10 liter of ion-exchanged water. Thereafter the washed cake was dried at a temperature of 80° C., and then was calcined at 400° C. to obtain a catalyst of Pd—Pt—Zn (Pd/Pt: 0.6). The resultant catalyst of Pd—Pt—Zn was wet crushed, and mixed with alumina sol to be made into slurry.

Subsequently, there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst C-4 having a chemical composition expressed in terms of atomic ratio of Pd/Pt/Zn being 0.02/0.35/1.0.

Catalyst D-4

Sodium carbonate anhydride in an amount of 177 g and 1000 mL of ion-exchanged water were placed in a 5 liter round bottom flask to dissolve the sodium carbonate, and the solution was adjusted to a temperature of 40° C. To the resultant solution was added a solution of 315 g of copper sulfate pentahydrate and 19.7 g of boric acid that were dissolved in 800 mL of ion-exchanged water, while the solution was adjusted to 40° C. Subsequently to the resultant mixed solution was added the slurry in which 77.0 g of zinc oxide was dispersed in 300 mL of ion-exchanged water, and immediately thereafter carbon dioxide gas was blown thereinto at a rate of 6 liter/hour. After one hour, the temperature thereof was raised to 80° C., and maintained thereat for 30 minutes. The carbon dioxide gas blowing was stopped after 2 hours of blowing, and then the mixture was cooled 60° C. To the cooled mixture was added the slurry which had been prepared from a solution of 49 g of aluminum sulfate dissolved in ion-exchanged water and a solution of 10.2 g of sodium hydroxide dissolved in 70 mL of ion-exchanged water under stirring for 20 minutes. The mixed slurry thus prepared was filtered to form a cake, which was washed with 12 liter of 0.05% aqueous solution of sodium hydroxide and 3 liter of ion-exchanged water. Thereafter the washed cake was dried at a temperature of 80° C., and then was calcined to obtain a catalyst of Cu—Zn—Al. The resultant catalyst of Cu—Zn—Al was wet crushed, and mixed with alumina sol to be made into slurry.

Subsequently there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst D-4 having a chemical composition expressed in terms of atomic ratio of Cu/Zn/B/Al being 1.33/1.0/0.3/0.3.

Catalyst E-4

Gallium oxide ($Ga_2O_3$) in an amount of 15 g was dispersed in 500 mL of ion-exchanged water, and the dispersion was adjusted to a temperature of 35° C. To the resultant dispersion were added under stirring, a solution of 4.17 g of palladium nitrate dihydrate which was dissolved in 500 mL of ion-exchanged water and adjusted to a temperature of 35° C., and 35 mL of 1 N aqueous solution of potassium hydroxide under stirring for 1 hour to prepare slurry. The resultant slurry was filtered to form a cake, which was washed with 4 liter of ion-exchanged water. Thereafter the washed cake was dried and then calcined to obtain a catalyst of Pd—Ga. The resultant catalyst of Pd—Ga was wet crushed, and mixed with alumina sol to be made into slurry.

Subsequently, there were repeated the steps of immersing a cordierite-made honeycomb (400 cells/square inch) into the slurried catalyst, blowing off an excess amount, and drying so that the catalyst was supported thereon in a catalyst amount of 200 g/L on a dry base. It was designated as Catalyst E-4 having a chemical composition expressed in terms of atomic ratio of Pd/Ga being 0.1/1.0.

Catalyst F-4

A catalyst was prepared in the same manner as in the Catalyst H-1, and designated as Catalyst F-4.

{Methanol Reforming Reaction}

EXAMPLE 13

The catalyst A-4 was packed as a catalyst bed in a through flow system reactor. Prior to activity evaluation, a reduction treatment thereof was carried out by introducing into an evaporator, an aqueous solution of methanol having a water/methanol ratio of 1.5 at 200° C. and an LHSV of methanol of 15 $hr^{-1}$. Thereafter air was mixed in the evaporated water/methanol on the downstream side of the evaporator outlet, and the temperature in the introduction line leading to a catalyst bed was regulated so that the mixed water/methanol was charged in the catalyst bed at 200° C. The reaction was controlled so that the temperature at the inlet of the catalyst bed came to be 400° C. by the air rate. The chemical composition of the gas after the reaction was analyzed by means of gas chromatography. The reactivity of methanol is given in Table 13, and carbon monoxide concentration at the outlet of the catalyst bed is given in Table 14.

EXAMPLE 14

The procedure in Example 13 was repeated to carry out the reduction treatment and reaction of methanol except that the catalyst B-4 was packed in the reactor. The results are given in Table 13 and Table 14.

EXAMPLE 15

The procedure in Example 13 was repeated to carry out the reduction treatment and reaction of methanol except that the catalyst C-4 was packed in the reactor, and an LHSV of methanol was set on 57 hr$^{-1}$. The results are given in Table 13 and Table 14.

COMPARATIVE EXAMPLES 11 TO 13

The procedure in Example 13 was repeated to carry out the reduction treatment and reaction of methanol except that any of the catalysts D-4, E-4 and F-4 was packed in the reactor. The results are given in Table 13 and Table 14.

TABLE 13

| | Reaction time (Hr) | 0 | 50 | 100 | 150 |
|---|---|---|---|---|---|
| | Catalyst | Methanol conversion (mol %) | | | |
| Example 13 | A-4(Pd—Pt—Zn) | 95.4 | 94.9 | 94.7 | 94.6 |
| Example 14 | B-4(Pd—Pt—Zn) | 94.8 | 94.1 | 94.1 | 92.9 |
| Example 15 | C-4(Pd—Pt—Zn) | 94.0 | 93.7 | 93.6 | 93.4 |
| Comparative Example 11 | D-4(Cu—Zn—Al) | 95.0 | 84.8 | 76.5 | 70.2 |
| Comparative Example 12 | E-4(Pd—Ga) | 91.8 | 89.0 | 85.2 | 80.4 |
| Comparative Example 13 | F-4(Pd—Zn) | 95.7 | 92.1 | 88.4 | 84.0 |

TABLE 14

| | Reaction time (Hr) | 0 | 50 | 100 | 150 |
|---|---|---|---|---|---|
| | Catalyst | CO concentration (mol %) | | | |
| Example 13 | A-4(Pd—Pt—Zn) | 1.7 | 1.7 | 1.7 | 1.8 |
| Example 14 | B-4(Pd—Pt—Zn) | 1.3 | 1.3 | 1.4 | 1.4 |
| Example 15 | C-4(Pd—Pt—Zn) | 1.9 | 2.0 | 2.0 | 2.1 |
| Comparative Example 11 | D-4(Cu—Zn—Al) | 0.4 | 0.3 | 0.3 | 0.3 |
| Comparative Example 12 | E-4(Pd—Ga) | 15.6 | 15.4 | 15.1 | 14.9 |
| Comparative Example 13 | F-4(Pd—Zn) | 1.1 | 1.3 | 1.6 | 2.0 |

What is claimed is:

1. A process for producing a hydrogen-containing gas, which comprises reacting methanol, steam and oxygen in the presence of a catalyst comprising palladium, zinc and at least one metal selected from the group consisting of chromium and gallium, wherein the atomic ratio of palladium/zinc is in the range of 0.004 to 2.2 and the atomic ratio of the sum of chromium and gallium/zinc is in the range of 0.03 to 2.

2. The process for producing a hydrogen-containing gas according to claim 1, wherein in the case of reacting methanol, steam and air, the molar ratio of steam to methanol is 1 to 10 mol, and the molar ratio of air to methanol is 0.3 to 5.0 mol.

3. The process for producing a hydrogen-containing gas according to claim 1, wherein the catalyst is supported on a carrier or a carrier structure.

4. The process for producing a hydrogen-containing gas according to claim 1, wherein an auto thermal reformer is used in reacting methanol, steam and oxygen.

5. A process for producing a hydrogen-containing gas, which comprises reacting methanol, steam and oxygen in the presence of a catalyst comprising palladium, zinc, copper and chromium, wherein the atomic ratio of palladium/zinc is in the range of 0.004 to 2.2, the atomic ratio of copper/zinc is in the range of 0.01 to 1.6, and the atomic ratio of chromium/zinc is in the range of 0.03 to 2.

6. The process for producing a hydrogen-containing gas according to claim 5, wherein in the case of reacting methanol, steam and air, the molar ratio of steam to methanol is 1 to 10 mol, and the molar ratio of air to methanol is 0.3 to 5.0 mol.

7. The process for producing a hydrogen-containing gas according to claim 5, wherein the catalyst is supported on a carrier or a carrier structure.

8. The process for producing a hydrogen-containing gas according to claim 5, wherein an auto thermal reformer is used in reacting methanol, steam and oxygen.

9. A process for producing a hydrogen-containing gas, which comprises reacting methanol, steam and oxygen in the presence of a catalyst comprising palladium, zinc, and either or both of indium and bismuth, wherein the atomic ratio of palladium/zinc is in the range of 0.004 to 2.2, the atomic ratio of indium/zinc is in the range of 0.025 to 2, and the atomic ratio of bismuth/zinc is in the range of 0.025 to 20.

10. The process for producing a hydrogen-containing gas according to claim 9, wherein in the case of reacting methanol, steam and air, the molar ratio of steam to methanol is 1 to 10 mol, and the molar ratio of air to methanol is 0.3 to 5.0 mol.

11. The process for producing a hydrogen-containing gas according to claim 9, wherein the catalyst is supported on a carrier or a carrier structure.

12. The process for producing a hydrogen-containing gas according to claim 9, wherein an auto thermal reformer is used in reacting methanol, steam and oxygen.

13. A process for producing a hydrogen-containing gas, which comprises reacting methanol, steam and oxygen in the presence of a catalyst comprising palladium, zinc, chromium, and either or both of indium and bismuth.

14. The process for producing a hydrogen-containing gas according to claim 13, wherein the atomic ratio of palladium/zinc is in the range of 0.004 to 2.2, the atomic ratio of chromium/zinc is in the range of 0.03 to 2, the atomic ratio of indium/zinc is in the range of 0.025 to 2, and the atomic ratio of bismuth/zinc is in the range of 0.025 to 20.

15. The process for producing a hydrogen-containing gas according to claim 13, wherein in the case of reacting methanol, steam and air, the molar ratio of steam to methanol is 1 to 10 mol, and the molar ratio of air to methanol is 0.3 to 5.0 mol.

16. The process for producing a hydrogen-containing gas according to claim 13, wherein the catalyst is supported on a carrier or a carrier structure.

17. The process for producing a hydrogen-containing gas according to claim 13, wherein an auto thermal reformer is used in reacting methanol, steam and oxygen.

* * * * *